United States Patent [19]
Allen

[11] 4,075,845
[45] Feb. 28, 1978

[54] FREEZE/THAW POWER SYSTEM

[76] Inventor: Milton Frank Allen, 2989 McCully Drive NE., Atlanta, Ga. 30345

[21] Appl. No.: 670,455

[22] Filed: Mar. 25, 1976

[51] Int. Cl.² .............................................. F03G 7/06
[52] U.S. Cl. .................................................... 60/527
[58] Field of Search ................ 60/527, 530, 528, 529, 60/531

[56] References Cited

U.S. PATENT DOCUMENTS

| | | | |
|---|---|---|---|
| 2,115,501 | 4/1938 | Vernet | 60/527 |
| 2,215,157 | 9/1940 | Platzner | 60/527 |
| 3,027,729 | 4/1962 | Chace | 60/527 X |

FOREIGN PATENT DOCUMENTS 360,623  12/1905  France ................................. 60/527

Primary Examiner—Allen M. Ostrager

[57] ABSTRACT

A method and apparatus using a FREEZE/THAW POWER CYCLE. The apparatus includes a piston driven by the expansion power of a fluid such as water in a cylinder on freezing and the thawing thereof with alternate, rapid freezing and thawing of the fluid by low and high temperature means with heat transfer rates facilitated by the use of heat pipes or tubes or other conductor means to produce a continuous single or multi cylinder quick, polution free and noiseless freeze/thaw power cycle.

6 Claims, 7 Drawing Figures

U.S. Patent  Feb. 28, 1978  Sheet 1 of 2  4,075,845
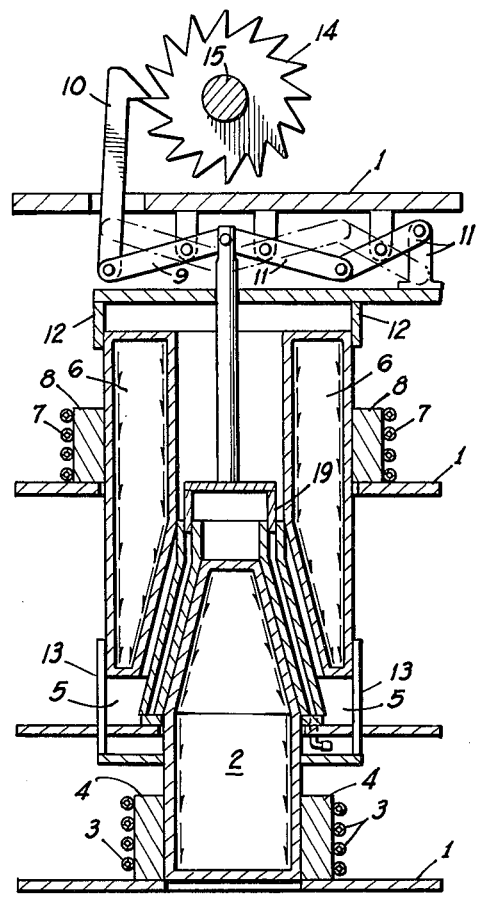
FIG 1
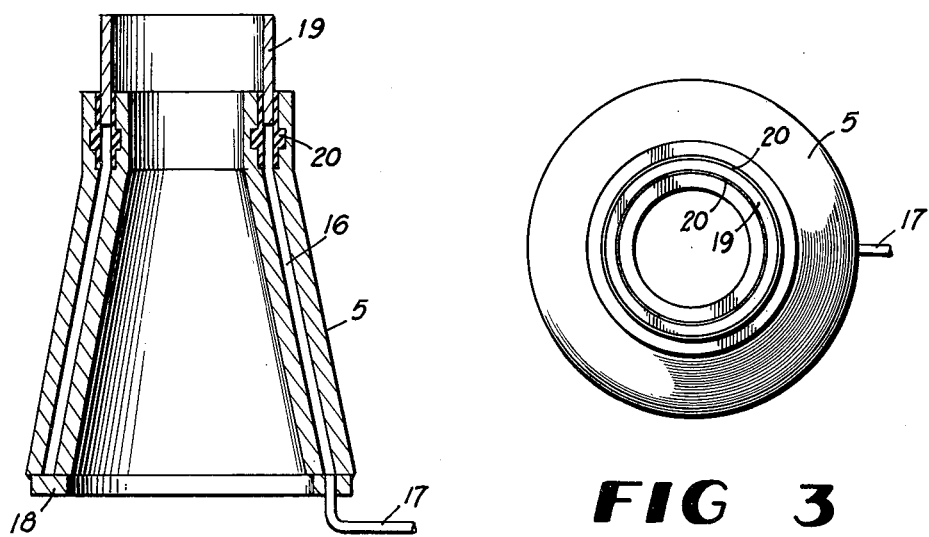
FIG 2
FIG 3

FREEZE/THAW POWER SYSTEM

BACKGROUND OF THE INVENTION

Field of the Invention

The invention relates to a method of using the energy or force created by the expansion of fluids such as water in the process of freezing in a cylinder to thereby drive a piston by a repeated process of freezing and thawing of such fluid in conjunction with the resulting power cycle to do mechanical work.

SUMMARY OF THE INVENTION

The purpose of the invention is to provide a new and alternate energy source for many vital functions depending on mechanical power for operation such as the propulsion of automobiles and other carriers because in this method gasoline is not the major factor for such propulsion. One important object therefore is to provide a way to help avert a national energy crisis and to provide an energy use resource against oil boycotts or gasoline shortage in the interest of national defense. Another object is to use this system for pollution free and noiseless mechanical operations.

Water is a preferred fluid because it normally freezes at 32° Farenheit and in so doing increases its volume by one-eleventh.

The mighty power of water as its expands on freezing to break rocks, water pipes and motor blocks etc. is well known.

Using this potential power of a fluid like water, the method is to quick freeze water in a cylinder by external or internal low temperature means so that a piston in the cylinder, as the only movable part of the cylinder, will be driven or moved by the force of the water expansion, caused by such freezing, to turn a crankshaft or turbine or other gear by a connecting rod or other device.

An alternate or quick thawing of the ice so formed in the cylinder is provided by high temperature means applied externally or internally so that the resulting cylinder and piston operation or a multi cylinder and piston operation would cause a continuous operating cycle and power flow to the crankshaft or turbine by the connecting rod or other gear to do mechanical work such as to turn wheels to propel a vehicle or other carriers.

Source means to provide hot and cold temperatures include but are not limited to solar energy, micro waves, electric storage batteries, heat producing fuels and refrigerants such as Freon made by the DuPont Company.

Advanced and continuing technology in the improvment and growing use of heat pipes or heat tubes and other temperature conductors to facilitate heat transfer rates, is used in the system for a fast, practical and useful freeze/thaw power cycle to do mechanical work without pollution and noise factors.

DESCRIPTION OF THE DRAWINGS

In the accompanying drawings, other objects and advantages of the invention will become apparent as set forth in the following description. It is emphasized that the illustrated use is quite simple and designed to only show workability of the concept that the expansion of a fluid such as water on freezing could be made to power various devices to turn a wheel to perform work and that is all it is intended to do. It is obvious that other mechanical linkage could be more efficient or more applicable for a particular operation.

There are seven drawings.

FIG. 1 is a view of the assembly of the equipment;

FIG. 2 shows some of the details of the water tube;

FIG. 3 shows a top view of the water tube embodiment;

Referring to FIG. 1, the equipment is supported on support plates 1. The assembly shows the arrangement at the start of the thaw cycle where ice is already formed in the freeze water chamber 5. 2 is a heat tube in which the heat supplied by water circulating through tube 3 at 70° Farenheit conducting to a copper ring 4 in order to provide good conductivity to the heat tube 2. In this operation, the refrigerant is located within the heat tube 2 and is evaporated by the 70° water source at the bottom of the heat tube as shown in FIG. I. The vapor travels up the center of the heat tube and condenses on the 32° or near 32° surface inside the heat tube near the top of the tube, 32° being that associated with frozen water. The condensed liquid flows by gravity and capillary action to the evaporating section of the heat tube, in proximity to the copper ring 4.

Figure 4:
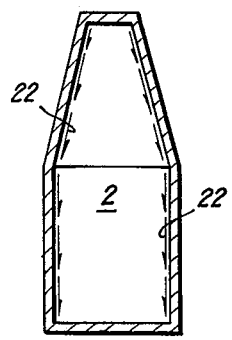
FIG. 4 shows various details of the freeze heat tube.

Once the water in the freeze chamber is thawed, riser tubes 19 connecting to the mechanical linkage fall down into the water tube proper, permitting the over center linkage to reset on the sprocket, through lever connectors 9 and 10, which in turn drives a shaft 15. In the process of settling, the riser tube snaps the over center linkage 11 forcing 12, the support for the heat tubes, downward, in this way separating thaw heat tube 2 from the freeze water chamber 5 and contacting the freeze heat tube 6 with the freeze water chamber 5.

The cold source is obtained from Freon made by the Dupont Company or other refrigerating material expanding at 0° Farenheit in the tubes 7 conducting through copper rings 8 to provide good conductivity with the freeze heat tube 6. Freon 21, made by the Dupont Company, as a preferred refrigerant, within the freeze heat tube 6 evaporates in contact with the 32° freeze water chamber 5, the vapor flowing up the center of the heat tube 6 and is condensed by the colder 0° Farenheit walls of the freeze cold source 7 and 8. The condensed liquid then flows by gravity and capillary action back to the evaporating section of the heat tube in proximity to the freeze water chamber 5.

Once enough heat has been conducted away from the freeze water chamber 5 to freeze the water in the chamber, the riser tube 19 is forced upward snapping the over center linkage and forcing movement of the drive shaft 15 through the sprocket wheel and linkages 9 and 10, in a counter-clockwise motion in the particular configuration described herein.

In FIG. I it can be seen that the mechanical linkage 11 is connected to 12 which in turn connects the freeze heat tube to the mechanical linkage. At the bottom of the freeze heat tube 6 it can be seen that 13, a brace or mechanical connector, connects the freeze heat tube to the thaw heat tube 2 in such a fashion that these units move together up and down depending upon whether the system is in the freeze or thaw part of the cycle. In either case, either heat tube 2 or 6 will be resting in contact with the water tube 5 at the end of the motion.

Referring to FIG. 2, the water tube is constructed of 1/6 inch high conductivity copper with a 1/32 inch thick inner chamber for the water. The lower end of this chamber is sealed off with 1/16 inch copper ring which is silver soldered to the other two pieces forming a single mechanical body out of the bottom of the water chamber 16. In the water tube 5 can be seen a fill tube 17 which is used to facilitate obtaining air free water only in the water tube. Near the top of the water tube configuration 20 is shown to describe some silicone rubber insulation which prevents sticking of the riser tube 19 on freezing of the water in the water tube. This silicone rubber insulation is especially cast to conform to the configuration shown on the water tube. The riser tube can be any relatively non-heat conducting material such as micarta, polished micarta, teflon or nylon. It is of such configuration that it rises vertically on freezing of the water in chamber 16. FIG. 3 is a top view of the configuration shown in FIG. 2.

Figure 5:
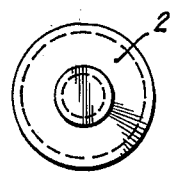
FIG. 5 shows a top view of the freeze heat tube embodiment.

In FIG. 4 the thaw heat tube 2 is constructed out of 1/16 inch tough pitch copper to obtain high thermal conductivity and has a 1/1000 inch refrasel (wire cloth) wicking to facilitate ready capillary flow of the liquid along the side walls of the tube. 22 shows this location. FIG. 5 shows a top view of the configuration seen in FIG. 4.

Figure 6:
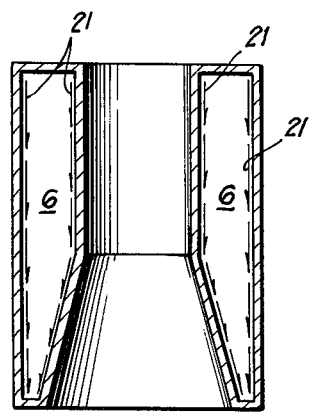
FIG. 6 shows the details of the thaw heat tube.
Figure 7:
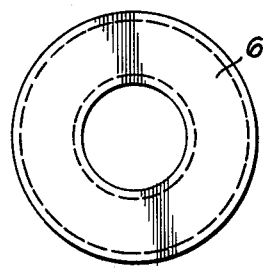
FIG. 7 shows a top view of the thaw heat tube embodiment.

Shown on FIG. 6 is the freeze heat tube 6 with 1/1000 inch refrasel wicking 21 shown on the inside and outside of the inner chamber 6. This heat tube is also constructed of 1/16 inch tough pitch copper to facilitate ready transfer of heat. FIG. 7 is a top view of the configuration shown in FIG. 6.

Various changes and modifications are considered to be within the principle of the invention and the scope of the following claims including other mechanical linkage more efficient or more applicable for a particular operation as well as other conductors to facilitate heat transfer rates.

I claim:

1. A method of driving a device using a piston slidably carried in a chamber with the chamber filled with a freezable liquid which experiences a change of volume upon freezing from a liquid state to a solid state comprising the steps of:
   (a) associating the piston with the fluid so that the piston is moved in response to a change in volume of the fluid;
   (b) freezing the fluid to a substantially solid state to change its volume and move the piston in a first direction by operatively associating a heat pipe with the fluid to withdraw heat from the fluid and freeze the fluid; and,
   (c) subsequently thawing the frozen fluid from its solid state to its liquid state to change the volume of the fluid and move the piston in a second direction opposite the first direction by operatively associating a second heat pipe with the frozen fluid to add heat thereto and thaw the fluid to its liquid state.

2. The method of claim 1 wherein the fluid is water.

3. Freeze/thaw apparatus for driving a device comprising a housing defining a chamber therein; a piston slidably carried in said chamber;
   a freezable fluid carried in said chamber which experiences a change in volume upon freezing from a liquid state to a solid state, said freezable fluid in operative association with said piston to cause said piston to linearly move said fluid experiences a change in volume;
   a heat absorbing source having a temperature below the freezing temperature of said freezable fluid;
   a heat generating source having a temperature greater than the thawing temperature of said freezable fluid;
   a cooling heat pipe;
   a heating heat pipe; and,
   control means for selectively and alternatively placing said cooling heat pipe in operative association with said freezable fluid in said chamber and said heat absorbing source for selectively freezing the fluid in said chamber to cause said fluid to change its volume and move said piston in a first linear direction, and for selectively and alternatively placing said heating heat pipe in operative association with said freezable fluid in said chamber and said heat generating source for selectively thawing said freezable fluid from its solid state to its liquid state to change the volume of said fluid and move said piston in a second linear direction opposite said first linear direction.

4. The freeze/thaw apparatus of claim 3 further including driven means operatively connected to said piston and driven by said piston, said driven means including an output shaft and connection means connecting said piston with said output shaft to convert said linear output motion of said piston into rotary motion of said output shaft.

5. The freeze/thaw apparatus of claim 4 wherein said connection means causes said output shaft to rotate in a first rotational direction in response to the movement of said piston linearly.

6. The freeze/thaw apparatus of claim 3 wherein said control means is operatively connected to and driven by said piston.

* * * * *